(12) United States Patent
Gomez

(10) Patent No.: US 12,479,588 B2
(45) Date of Patent: Nov. 25, 2025

(54) METHOD OF OPTIMIZING THE NOISE GENERATED IN FLIGHT BY A ROTORCRAFT

(71) Applicant: AIRBUS HELICOPTERS, Marignane (FR)

(72) Inventor: Nayibe Gomez, Aix En Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/509,361

(22) Filed: Nov. 15, 2023

(65) Prior Publication Data

US 2024/0084748 A1 Mar. 14, 2024

Related U.S. Application Data

(62) Division of application No. 16/832,589, filed on Mar. 27, 2020, now Pat. No. 11,852,084.

(30) Foreign Application Priority Data

Mar. 29, 2019 (FR) ........................................ 1903327

(51) Int. Cl.
*B64D 35/025* (2025.01)
*B64C 27/04* (2006.01)
(Continued)

(52) U.S. Cl.
CPC ............ *B64D 35/025* (2024.01); *B64C 27/04* (2013.01); *B64D 27/02* (2013.01); *B64D 27/10* (2013.01);
(Continued)

(58) Field of Classification Search
CPC .. B64D 2027/026; B64D 27/02; B64D 27/10; B64D 27/14; B64D 27/24; B64D 27/33;
(Continued)

(56) References Cited

U.S. PATENT DOCUMENTS 8,447,441 B2  5/2013  Calvignac et al.
8,852,052 B2  10/2014 Sujan et al.
(Continued)

FOREIGN PATENT DOCUMENTS

EP      2571764 A1   3/2013
FR      3039614 A1   2/2017
WO   2011144690 A1  11/2011

OTHER PUBLICATIONS

The China National Intellectual Property Administration, the first Office Action for corresponding Chinese Patent Application No. 2020102359495 issued Feb. 4, 2024.
(Continued)

*Primary Examiner* — Jason H Duger
(74) *Attorney, Agent, or Firm* — Brooks Kushman P.C.

(57) ABSTRACT

A method of optimizing the noise generated by a hybrid power plant of a rotorcraft in flight, the hybrid power plant driving a main rotor of the rotorcraft in rotation and being provided with at least one engine, with at least one electric machine, and with at least one electrical energy source that electrically powers the electric machine. The method includes a determination step for determining a required power delivered by the hybrid power plant and that is required for the flight phase, and a distribution step for distributing the required power between the at least one engine and the electric machine as a function of a target noise level and of the required power for the flight phase, as well as of a model for the noise generated by the at least one engine as a function of one of its parameters.

14 Claims, 4 Drawing Sheets

(51) Int. Cl.
    *B64D 27/02*     (2006.01)
    *B64D 27/10*     (2006.01)
    *B64D 27/24*     (2024.01)
    *B64D 27/32*     (2024.01)
    *B64D 27/33*     (2024.01)
    *B64D 27/34*     (2024.01)
    *B64D 31/00*     (2024.01)
    *B64D 31/06*     (2024.01)
    *B64D 31/18*     (2024.01)
    *F01N 1/00*     (2006.01)
    *F02D 35/00*     (2006.01)

(52) U.S. Cl.
    CPC ............ *B64D 27/24* (2013.01); *B64D 27/32* (2024.01); *B64D 27/33* (2024.01); *B64D 27/34* (2024.01); *B64D 31/00* (2013.01); *B64D 31/06* (2013.01); *B64D 31/18* (2024.01); *F01N 1/00* (2013.01); *F02D 35/0007* (2013.01); *B64D 27/026* (2024.01); *F05D 2270/333* (2013.01)

(58) Field of Classification Search
    CPC ........ B64D 27/34; B64D 31/00; B64D 31/06; B64D 35/08; B64D 31/18; B64D 35/025; F04D 2270/333; B64C 27/04; F01N 1/00; F02D 35/0007; F02D 35/007
    See application file for complete search history.

(56) References Cited

U.S. PATENT DOCUMENTS

| | | | |
|---|---|---|---|
| 9,376,983 B2* | 6/2016 | Moeckly | ................ F02D 45/00 |
| 10,906,656 B2* | 2/2021 | Gilliland | ................ B64D 27/33 |
| 2011/0024555 A1* | 2/2011 | Kuhn, Jr. | ............ B64C 29/0033 |
| | | | 244/17.11 |
| 2011/0178648 A1 | 7/2011 | Calvignac et al. | |
| 2013/0092789 A1 | 4/2013 | Botti et al. | |
| 2014/0010652 A1 | 1/2014 | Suntharalingam et al. | |
| 2014/0054411 A1* | 2/2014 | Connaulte | .............. B64D 27/24 |
| | | | 244/17.13 |
| 2014/0117148 A1* | 5/2014 | Dyrla | ..................... B64C 27/14 |
| | | | 244/17.13 |
| 2014/0145028 A1 | 5/2014 | Gomez | |
| 2014/0156166 A1 | 6/2014 | Moeckly et al. | |
| 2015/0028594 A1* | 1/2015 | Mariotto | ................ B64D 27/33 |
| | | | 310/78 |
| 2015/0100181 A1* | 4/2015 | Strauss | .................. B64D 31/16 |
| | | | 701/3 |
| 2016/0362100 A1 | 12/2016 | Piper et al. | |
| 2018/0009542 A1 | 1/2018 | Kuster | |
| 2018/0251228 A1 | 9/2018 | Sands et al. | |
| 2018/0346139 A1* | 12/2018 | Ferran | ................... B64D 27/24 |
| 2019/0337629 A1 | 11/2019 | Gilliland et al. | |

OTHER PUBLICATIONS

Heger, Rainer et al. Helicopter Noise Reduction Technology. International Civil Aviation Organization. Apr. 2015. 4 pages.

Edwards, Bryan et al. Revolutionary Concepts for Helicopter Noise Reduction: Silent Program. NASA Langley Research Center; Hampton, VA United States. May 1, 2002. 88 pages.

French Search Report for French Application No. FR 1903327, Completed by the French Patent Office, Dated Jan. 21, 2020, 10 pages.

* cited by examiner

METHOD OF OPTIMIZING THE NOISE GENERATED IN FLIGHT BY A ROTORCRAFT

CROSS-REFERENCE TO RELATED APPLICATIONS

This application is a divisional of U.S. application Ser. No. 16/832,859, filed Mar. 27, 2020, now U.S. Pat. No. 11,852,084, which claims priority to French patent application No. FR 19 03327, filed Mar. 29, 2019, the disclosures of which are incorporated in their entirety by reference herein.

TECHNICAL FIELD

Background of the Invention

(1) Field of the Invention

The present invention lies in the field of power plants for rotorcraft, and in particular, in the narrower field of hybrid power plants.

(2) DESCRIPTION OF RELATED ART

The present invention relates to a method of optimizing the noise generated in flight by a rotorcraft.

A rotorcraft, also referred to as a "rotary-wing aircraft", conventionally has a fuselage and at least one main rotor that is driven in rotation by a power plant and that provides, at least partially, the lift and/or the propulsion for the rotorcraft. The rotorcraft may also be provided with an anti-torque device. An anti-torque device is sometimes constituted by an auxiliary rotor that is generally situated at the rear end of the rotorcraft, e.g. at the end of a tail boom of the rotorcraft, and that is driven in rotation by the power plant of the rotorcraft.

A rotorcraft may also have a plurality of main rotors that simultaneously and at least partially provide the lift and/or propulsion for the rotorcraft.

A rotorcraft may also have one or more propulsion propellers, e.g. placed on either side of the fuselage, and optionally on wings of the rotorcraft. The propellers are generally driven in rotation by the power plant of the rotorcraft.

The power plant of the rotorcraft may have one or more fuel-burning engines, e.g. gas turbines or piston engines, and one or more mechanical power transmission gearboxes or "main gearboxes".

While it is operating in flight, i.e. when it is off the ground, a rotorcraft thus has potentially various noise sources, namely each engine, each main gearbox, each main rotor, and, possibly, each auxiliary rotor and each propeller.

The noise generated by an engine is caused, firstly, by the successive combustions of the fuel, and secondly by the mechanical elements of the engine, such as, in particular, the rotary blades in a gas turbine. Such noise generated by an engine can vary, in particular, with variations in the operating parameters of the engine, such as its speed of rotation, its temperature, or indeed the torque it delivers, for example. Such noise might also vary with variations in the conditions under which the engine is used, in particular, in the temperature and atmospheric pressure outside the engine.

The noise generated by a main gearbox is mainly caused by the rotary elements such as the shafts and bearings of the gearbox, as well as by the gearing elements for reducing or increasing the speeds of rotation, such as the gear wheels and/or other meshing elements of the gearbox. Such noise generated by a gearbox varies mainly with variations in the speeds of rotation of its rotary elements and of its gearing elements for reducing or increasing speeds of rotation.

The noise generated by each main rotor, by each auxiliary rotor and/or by each propeller is caused by the aerodynamic behaviors of their blades. Such noise generated by each rotor and/or by each propeller varies as a function of the conditions under which each of them is used and thus as a function of the flight phase of the rotorcraft.

The noise generated by a rotorcraft can cause problems as regards having the rotorcraft accepted, in particular, by the neighborhoods around the landing areas, such as aerodromes or airports, and in the urban or rural-urban fringe areas over which the rotorcraft can fly at low altitudes. The passengers of the rotorcraft and the crew operating on the ground on and around the rotorcraft also suffer from such noise and are also increasingly demanding that the noise to which they are subjected in the environment around the rotorcraft be reduced.

These various sources of noise are combined while the rotorcraft is in flight, but their contributions to the overall spectrum of noise of the rotorcraft as perceived on the ground vary considerably as a function not only of the flight conditions and of the flight phase of the rotorcraft, but also of the position of the observer. However, one or more noise sources can stand out and be dominant for certain flight phases of the rotorcraft.

Thus, during hovering flight or during takeoff, which is a transition flight phase between being on the ground and flying proper, the auxiliary rotor can be a dominant noise source due to the high thrust it has to deliver. The contribution from the noise of the engine may also be considerable, or indeed constitute the dominant noise source, in particular when the auxiliary rotor is provided with fairing or ducting because the noise of the auxiliary rotor is partially masked by the fairing or ducting for an observer under the flight path.

In level cruising flight, the situation is different, since the main rotor and the auxiliary rotor without fairing or ducting generally then constitute the predominant noise sources.

In approach flight, the main rotor is the origin of the most significant noise generated by the rotorcraft.

Solutions exist that aim to reduce the noise generated by a rotorcraft. For example, optimizing the engine(s) of the power plant makes it possible to obtain a reduction in the noise generated by said power plant. Similarly, optimizing the paths and/or the speeds of the rotorcraft makes it possible to reduce the noise generated by the rotorcraft. Noise can also be reduced by optimizing the rotors and their blades, or indeed the gearbox(es) of the power plant.

The report "Helicopter Noise Reduction Technology" published in April 2015 by the International Civil Aviation Organization (ICAO) provides a review of the state-of-the-art solutions in the field.

The report NASA/CR-2002-211650, "Revolutionary Concepts for Helicopter Noise Reduction—S.I.L.E.N.T. Program" by Bryan Edwards and Charles Cox, published in May 2002, identifies, in particular, solutions that are applicable to main and auxiliary rotors.

However, such solutions for reducing noise generated by a rotorcraft procure varying degrees of effectiveness.

The prior art also includes Document EP 2 571 764 that discloses a rotorcraft equipped with a hybrid power plant or "hybrid drive" including an internal combustion engine, an electric motor, and an electricity generator. The engine drives the electricity generator in rotation in order to generate electrical energy used for electrically powering the electric motor. The electric motor is connected to the main rotor of the rotorcraft in order to drive it in rotation. That hybrid power plant can further include one or more electrical energy storage devices, firstly so as to store at least a portion of the electrical energy generated by the electricity generator, and secondly so as to power the electric motor independently of operation of the engine.

Furthermore, Document U.S. Pat. No. 8,852,052 discloses a hybrid power plant or "hybrid power train" for a motor vehicle. That hybrid power train includes one internal combustion engine and two electric motors. By appropriately selecting the power distribution between the engine and the motors, it is possible, in particular, to make overall savings when using the motor vehicle. Other parameters are optionally also included for the purpose, for example, of guaranteeing a reserve of available power and/or of preserving the longevity of the life of the vehicle. The power distribution can also be selected as a function of the noise generated by the vehicle so as to limit that noise relative to a maximum audible noise limit value.

Document US 2016/0362100 discloses a system for controlling a power plant or "powertrain system" for a motor vehicle. That powertrain system includes one internal combustion engine and two electric motors. The power and the operating speed of the engine are adjusted during certain operating phases so that neither an audible limit value nor a maximum discernible vibration level are exceeded.

Document US 2018/0009542 discloses a hybrid power plant or "hybrid engine system" for a helicopter that includes an internal combustion engine and an electric motor. The engine and the motor are coupled to the main rotor of the helicopter and are configured to drive the main rotor separately or collectively.

Finally, Document US 2014/0010652 discloses a propulsion unit or "powertrain system" for an aircraft, that powertrain system including a transmission shaft to which an internal combustion engine and an electric motor are connected.

BRIEF SUMMARY OF THE INVENTION

An object of the present invention is to moderate and to optimize the noise generated in flight by a rotorcraft.

The present invention thus provides a method of optimizing the noise generated by a hybrid power plant of a rotorcraft during a flight phase, the hybrid power plant being provided with at least one internal combustion engine and with at least one electric machine.

This method of optimizing the noise generated by a power plant of a rotorcraft during a flight phase includes the following steps:
  a determination step for determining a required power to be delivered by the hybrid power plant for the flight phase; and
  a distribution step for distributing the required power between the at least one engine and at least one electric machine as a function of a target noise level and of the required power for the flight phase, as well as of a model for the noise generated by said at least one engine depending on an operating parameter of said at least one engine.

The present invention makes it possible to moderate and to optimize the noise generated in flight by a rotorcraft, firstly, for example, so as to improve the comfort of the passengers of the rotorcraft, and secondly, for example, so as to limit generation of noise that can be a nuisance in the environment overflown by the rotorcraft, in particular in urban or rural-urban fringe areas. To this end, the rotorcraft uses a hybrid power plant that includes a mechanical energy source in addition to the internal combustion engines, and that includes, in particular, at least one electric machine associated with an electrical energy source, in order to drive each rotor of the rotorcraft in rotation, and in particular the main rotor during this flight phase of the rotorcraft.

The method of the invention thus makes it possible, in certain flight phases and under certain flight conditions, to moderate the noise generated by a rotorcraft by reducing the speed of each engine, with the available power from the hybrid power plant remaining the same, by providing the supplementary power that is necessary by means of a less noisy supplementary energy source.

This method may be performed after an order is given by a pilot of the rotorcraft requiring a moderation in the noise of the rotorcraft in flight, e.g. via a switch or a button present on the instrument panel of the rotorcraft, or indeed said method may be performed automatically. For example, a computer determines the current flight phase in usual manner and controls the power plant accordingly.

The rotorcraft includes, in particular:
  a hybrid power plant;
  at least one rotor driven in rotation by the hybrid power plant, in particular at least one main rotor;
  a management system for managing the hybrid power plant, which system is provided with a computer, with at least one control unit for controlling said at least one engine, and with a control device for controlling each electric machine, which device controls and manages operation of said at least one electric machine; and
  at least one electrical energy source electrically powering at least one electric machine via an electrical network of the rotorcraft.

An engine may be a piston engine or else, more generally on rotorcraft, a gas turbine or turboshaft engine comprising a gas generator and a free turbine.

In the context of the invention, at least one electric machine of the hybrid power plant of the rotorcraft is an electric motor performing a drive function only, or else it is a reversible electric machine suitable for operating in motor mode or in electricity generator mode. In this way, said at least one electric machine co-operates with the at least one electrical energy source to form a supplementary mechanical energy source that is suitable for driving each rotor of the rotorcraft in rotation, in particular, via a gearbox of the hybrid power plant. Thus, at least one electric machine advantageously makes it possible to participate in driving each rotor of the rotorcraft and thereby to limit the contribution from each engine to driving each rotor, and, therefore, to limit the generation by each engine of noise that might be a nuisance in the environment of the rotorcraft.

Each electric machine of the hybrid power plant of the rotorcraft is characterized by a maximum power corresponding to its maximum capacities, independently of the quantity of energy available in each electrical energy source of the rotorcraft, and without said electric machine being damaged by delivering such power. Said maximum power may typically lie in the range 15% of the maximum power delivered by each engine of the hybrid power plant to 25% of the maximum power delivered by each engine of said power plant, in order to limit, in particular, the weight of the electric machine.

In electricity generator mode, an electric machine makes it possible to transform mechanical energy delivered by the main rotor or indeed by at least one engine into electrical energy, possibly for slowing down the rotors and/or the engine.

An electric machine may be placed in various positions within the hybrid power plant of the rotorcraft. Document FR 3 039 614, in particular, discloses installation configurations for an electric machine as coupled to a main gearbox, to an engine, or indeed directly to the main rotor of the rotorcraft.

For example, when the engine is a gas turbine or turboshaft engine, an electric machine may be installed between the free turbine and a main gearbox of the hybrid power plant. The electric machine thus delivers mechanical power to the gearbox.

In another example, a power electric machine may be installed on a specific and dedicated inlet of a gearbox and thus deliver mechanical power directly to the gearbox.

An electric machine may also be installed on the hub of the main rotor of the rotorcraft in order to deliver mechanical power directly to the hub of the main rotor.

In addition, each electric machine of the hybrid power plant of the rotorcraft may be powered by one or more electrical energy sources on board the rotorcraft. An electrical energy source may, for example, be an electrical energy storage device, such as an electric battery or indeed a fuel cell. An electrical energy source may also be an electricity generator driven in rotation by a dedicated engine or indeed by an engine of the hybrid power plant of the rotorcraft.

Furthermore, the hybrid power plant may include a first coupling device arranged between at least one engine and a main gearbox. The hybrid power plant may also include a second coupling device arranged between at least one electric machine and a mechanical transmission system driving each rotor of the rotorcraft in rotation, in particular, between at least one electric machine and the hub of the main rotor of the rotorcraft.

The first coupling device thus makes it possible to avoid driving the engine in question in rotation in the event that each rotor of the rotorcraft is being driven in rotation by at least one electric machine only. Similarly, the second coupling device makes it possible to avoid driving the electric machine in question in rotation when each rotor of the rotorcraft is being driven in rotation by at least one engine only. For example, the first coupling device and the second coupling device each comprise a clutch or a freewheel.

In addition, the management system of the hybrid power plant includes, in particular, a computer making it possible to perform the steps of the method of the invention for optimizing the noise generated by a hybrid power plant of a rotorcraft during a flight phase. For example, the computer may include a processor, an integrated circuit, a programmable system, a logic circuit, or indeed any equivalent device, these examples not limiting the scope given to the meaning of the term "computer". The computer may also include a memory that, in particular, stores instructions relating to the steps of the method.

The management system for managing the hybrid power plant may also include at least one control unit for controlling each engine and a control device for controlling each electric machine.

For example, a control unit for controlling an engine, and in particular, a turboshaft engine, may be a control unit known as an "Electronic Engine Control Unit" (EECU), or indeed an engine computer known as a "Full Authority Digital Engine Control" (FADEC). This control unit makes it possible firstly to collect information about operating parameters of the engine, such as its operating temperature, its speed of rotation, or indeed its torque, and secondly to control operation of it, in particular its speed of rotation, and the power that it delivers.

A control device for controlling an electric machine controls and manages operation of the electric machine, both in motor mode and in generator mode.

A control device makes it possible, in particular, to control electrical powering of an electric machine and interrupting of said electrical powering, as well as to control and to change the speed of the electric machine and the power it delivers in order to regulate operation thereof. Such a control device includes a computer and is, for example an "Electronic Speed Controller" (ESC). The Electronic Speed Controller (ESC) may include an internal electronic circuit or "Battery Eliminator Circuit" (BEC) making it possible to regulate the voltage powering each electric machine.

The target noise level corresponds to a predetermined noise value that each engine could reach when the method of the invention is activated during a predetermined flight phase and as a function of particular conditions constituted by the weight of the rotorcraft, its altitude, and the outside temperature.

The target noise level may also be defined for the power plant as a whole when said power plant includes at least two engines, the noise generated by each of the engines then combining.

For example, the target noise level may be equal to a value 2 decibels (2 dB) less than the level of noise generated by each engine during takeoff or in hovering flight at the Maximum Takeoff Power (maximum TOP) for a given outside air temperature and a given altitude.

The target noise level may also be defined as a function of the environment overflown by the rotorcraft and/or of a height of flight of the rotorcraft relative to the overflown ground. In particular, the target noise level aims to limit the noise disturbance generated by the rotorcraft for people on the ground in the overflown environment, in particular, when the rotorcraft is flying at low altitude, in an urban or rural-urban fringe area.

The required power to be delivered by the hybrid power plant for the flight phase of the rotorcraft may be determined in usual manner, as a function of the flight phase of the rotorcraft and of the flight conditions, namely the temperature and atmospheric pressure outside the rotorcraft, and of the weight of the rotorcraft, of the speed of rotation of the rotors, and of the efficiency of the rotorcraft and of the power plant, for example.

For example, the required power is determined on the basis of a performance model including a set of curves of variation in the required power. Each curve may be defined for a weight value of the rotorcraft and for a pair of values for the temperature and atmospheric pressure outside the rotorcraft. Each curve may also be defined for a value for the weight of the rotorcraft and propose a variation in the required power as corrected as a function of the variations in the outside temperature and in the outside atmospheric pressure. Each curve may also be a function of the speed of rotation of a rotor, mainly the main rotor, if the speed of rotation of said rotor is variable for the flight phase being considered.

The required power may be determined when the rotorcraft is dimensioned. The engine delivers the required power as a function of the setpoint speed of rotation of the main rotor, without then needing to compute the required power every time, but merely by delivering more or less power as a function of the difference between the speed of rotation of the main rotor and the setpoint speed of rotation.

The current flight phase of the rotorcraft may also be determined while the required power is being determined. Said flight phase may also be determined during a specific step, in parallel to determining the required power. The flight phase may, for example, be determined as a function of the height of flight of the rotorcraft and/or of its forward speed.

Then, the required power is distributed between each engine and at least one electric machine. In this way, the speed of each engine is generally reduced, the reduction in the power delivered by each engine being compensated for by a first supplementary power delivered by at least one electric machine, thereby advantageously making it possible to limit the noise generated by each engine and, therefore, by the hybrid power plant, during the flight phase.

To this end, the distribution step for distributing the required power may include the following sub-steps:
- a first determination sub-step for determining a main power to be delivered by each engine so that each engine generates a sound level less than or equal to the target noise level, the main power being determined as a function of the target noise level and of the model for the noise generated by each engine; and
- a second determination sub-step for determining a first supplementary power to be delivered by at least one electric machine so that the hybrid power plant delivers the required power.

In addition, when the first supplementary power is less than or equal to an available power of the at least one electric machine, the distribution step for distributing the required power further includes the following sub-steps:
- a first control sub-step for causing at least one electric machine to deliver the first supplementary power; and
- a second control sub-step for causing each engine to deliver the main power.

Each engine thus advantageously delivers a main power corresponding to a sound level emitted by each engine that is less than or equal to the target noise level. This main power is thus defined as a function of said target noise level and of the model for the noise from each engine. At least one electric machine then delivers the first supplementary power that is necessary and sufficient for the hybrid power plant to deliver the required power equal to the sum of the main power delivered by each engine and of the first supplementary power delivered by each electric machine.

However, when the first supplementary power is greater than the available power, the distribution step for distributing the required power further includes the following sub-steps:
- a third control sub-step for causing at least one electric machine to deliver a first supplementary power that is equal to the available power; and
- a fourth control sub-step for causing each engine to deliver a main power that is equal to a second supplementary power so that the hybrid power plant delivers the required power.

In this situation, the required power delivered by the hybrid power plant is then equal to the sum of the second supplementary power delivered by each engine and of the first supplementary power delivered by each electric machine.

For example, the available power of an electric machine may be equal to the maximum power that said electric machine can deliver without giving rise to damage to said electric machine. This maximum power is independent of the quantity of electrical energy available in each electrical energy source powering said electric machine.

The available power of an electric machine may also be calculated as a function of a quantity of electrical energy available in each electrical energy source powering said electric machine, and as a function of a duration for which said quantity of electrical energy can be used until the electrical energy source is exhausted. In this way, the electric machine is capable of delivering the available power for the predetermined duration.

The model for the noise generated by each engine may be established during a preliminary step performed, for example, during bench testing of each engine or indeed during flight testing of the rotorcraft prior to it being commissioned. However, such a model may also be generated again during the life of the engine or of the rotorcraft, as a function of the changes in and/or of the ageing of each engine of the hybrid power plant of the rotorcraft.

This model for the generated noise is determined as a function of one or more operating parameters of the engine. For example, this model for the noise generated by an engine may take the form of a curve or indeed of a set of curves for variation in the sound level of the noise from the engine as expressed in decibels (dB) as a function of one or more operating parameters of the engine. This model for the noise that is generated may then be expressed in the form of one or more equations or indeed of pairs of coordinates making it possible to plot said curve or said set of curves.

For example, an operating parameter of the engine may be the speed of rotation of the engine, an operating temperature of the engine, or indeed a torque delivered by the engine. An operating parameter of the engine may also be the power delivered by said engine.

When the engine is a turboshaft engine comprising a gas generator and a free turbine, the operating parameter of the engine may, for example, be the speed of rotation of the gas generator, the temperature of the gases at the outlet of the combustion chamber of the gas generator or indeed the torque delivered by the free turbine or optionally by the gas generator.

In addition, operation of an engine is influenced by the temperature and the atmospheric pressure outside said engine. The model for the generated noise may include a set of curves, each curve being defined for a pair of values for the temperature and for the atmospheric pressure outside the engine.

The operating parameter of an engine may also take into account the variations in the temperature and atmospheric pressure outside said engine. For example, for a turboshaft engine, the operating parameter may be a reduced speed of rotation of the gas generator, which speed is corrected as a function of the variations in the temperature and atmospheric pressure outside the engine. In this situation, the model may include a single curve proposing a variation in the sound level of the noise generated by the turboshaft engine as a function of said reduced speed of rotation of its gas generator.

Furthermore, when the hybrid power plant includes a plurality of engines, the model for the noise that is generated by them may be defined independently for each engine or else for the hybrid power plant as a whole by combining the noise from each of the engines.

The model for the noise generated by each engine may include a plurality of increase and decrease zones. The sound level of an engine does not necessarily follow a constant change relative to the operating parameter of the engine, but rather it may have a plurality of extrema.

For example, the sound level of an engine increases to its first extremum A while the operating parameter increases, and then the sound level decreases down to a second extremum B while the operating parameter continues to increase. Beyond the second extremum B, the sound level increases again to reach maximum noise levels and values while the operating parameter increases.

As a result, it is important to characterize the engine because, in the decrease zone lying between the extrema A and B, a reduction in the operating parameter of the engine leads to an increase in the noise generated by said engine, i.e. to the opposite of the desired effect, which is to reduce the noise that is generated.

Consequently, the decrease zone lying between the two extrema A and B is a zone that is preferably to be avoided for determining the main power to be delivered by each engine in order to limit the noise generated by each engine, and in particular in order to avoid an increase in that noise.

Therefore, during the distribution of the required power, if the power delivered by each engine causes at least one engine to operate in the decrease zone lying between the first and second extrema A and B, the value for the operating parameter of said at least one engine is increased in order to leave the decrease zone and go to downstream of the second extremum B. The power delivered by said at least one engine then also finds itself increased, and, conversely, the first supplementary power delivered by at least one electric machine is reduced so that the hybrid power plant delivers the required power.

In addition, if the power delivered by the hybrid power plant is greater than the required power, at least one electric machine can operate in generator mode, if said electric machine is reversible, so as to transform the surplus power delivered by the power plant into electrical energy. That electrical energy is then used by the electrical network of the rotorcraft, or else it is stored in at least one electrical energy source of the rotorcraft.

The method of the invention for optimizing the noise generated by a rotorcraft in flight may further include monitoring steps that are optional and that are performed in parallel or indeed sequentially.

A first monitoring step makes it possible to monitor each engine of the power plant to determine whether it is in an on state, an off state, or a state making it possible to drive each rotor while also complying with a predetermined setpoint speed of rotation for each rotor.

A second monitoring step makes it possible to monitor each electric machine of the power plant to determine whether it is in an on state or in an off state, as well as to determine its speed.

A third monitoring step makes it possible to monitor the electrical network of the rotorcraft to check whether the electrical network is capable of powering at least one electric machine. If the electrical network is capable of powering at least one electric machine, an authorization to power at least one electric machine is then issued. This authorization to power may, in particular, be a condition necessary for performing any control sub-step for controlling at least one electric machine.

The method may also include an anticipated switch-on step for switching on at least one electric machine in anticipation subsequently to the third monitoring step for monitoring the electrical network. During this anticipated switch-on, at least one electric machine is switched on as soon as the authorization to power is issued, without this at least one electric machine transmitting any mechanical power to each rotor of the rotorcraft. In this way, this anticipated switch-on advantageously makes it possible to anticipate performing any controlling of at least one electric machine, it being possible for at least one electric machine to deliver mechanical power almost instantaneously whenever necessary.

The method of the invention for optimizing the noise may also include a protection step made up of two sub-steps. A first sub-step for determining the speed of rotation of at least one rotor, in particular the main rotor, is performed and then, if the speed of rotation of said at least one rotor is greater than a predetermined speed, a second sub-step for switching off each electric machine is performed. This additional protection step thus makes it possible to avoid at least one rotor reaching overspeed when it is driven by at least one electric machine.

Furthermore, the method of the invention may include an inhibition step for inhibiting the distribution step for distributing the required power. The predominant noise source of the rotorcraft in flight is not always an engine, but rather it may be a rotor or indeed the main gearbox as a function of the flight phase of the rotorcraft and of the flight conditions.

Therefore, the inhibition step inhibits the distribution step for distributing the required power when the predominant noise source of the rotorcraft is not an engine, e.g. during a level cruising flight phase or during an approach flight phase.

In addition, the power delivered by the hybrid power plant may be greater than the required power during the flight phases when the predominant noise source of the rotorcraft is not an engine, and at least one electric machine can then operate in generator mode, if said electric machine is reversible, in order to transform the surplus power delivered by the power plant into electrical energy. That electrical energy is then used by the electrical network of the rotorcraft, or else it is stored in at least one electrical energy source of the rotorcraft for the purpose of being used subsequently, e.g. during a hovering flight phase.

The method of the invention for optimizing the noise generated by a hybrid power plant of a rotorcraft during a flight phase thus advantageously makes it possible to reduce the noise generated in flight by its engine(s), when the flight phase and the flight conditions so permit, in order to improve the comfort of the passengers of the rotorcraft and in order to limit the nuisance and discomfort in the environment overflown by the rotorcraft. This moderation in the noise generated by the rotorcraft is obtained without degrading the performance of the rotorcraft, the reduction in the power delivered by each engine being compensated for by another power source that is much less noisy, in particular, an electric machine.

BRIEF DESCRIPTION OF THE DRAWING

The invention and its advantages appear in greater detail from the following description of examples given by way of illustration with reference to the accompanying figures, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Elements that are present in more than one of the figures are given the same references in each of them.

Figure 1:
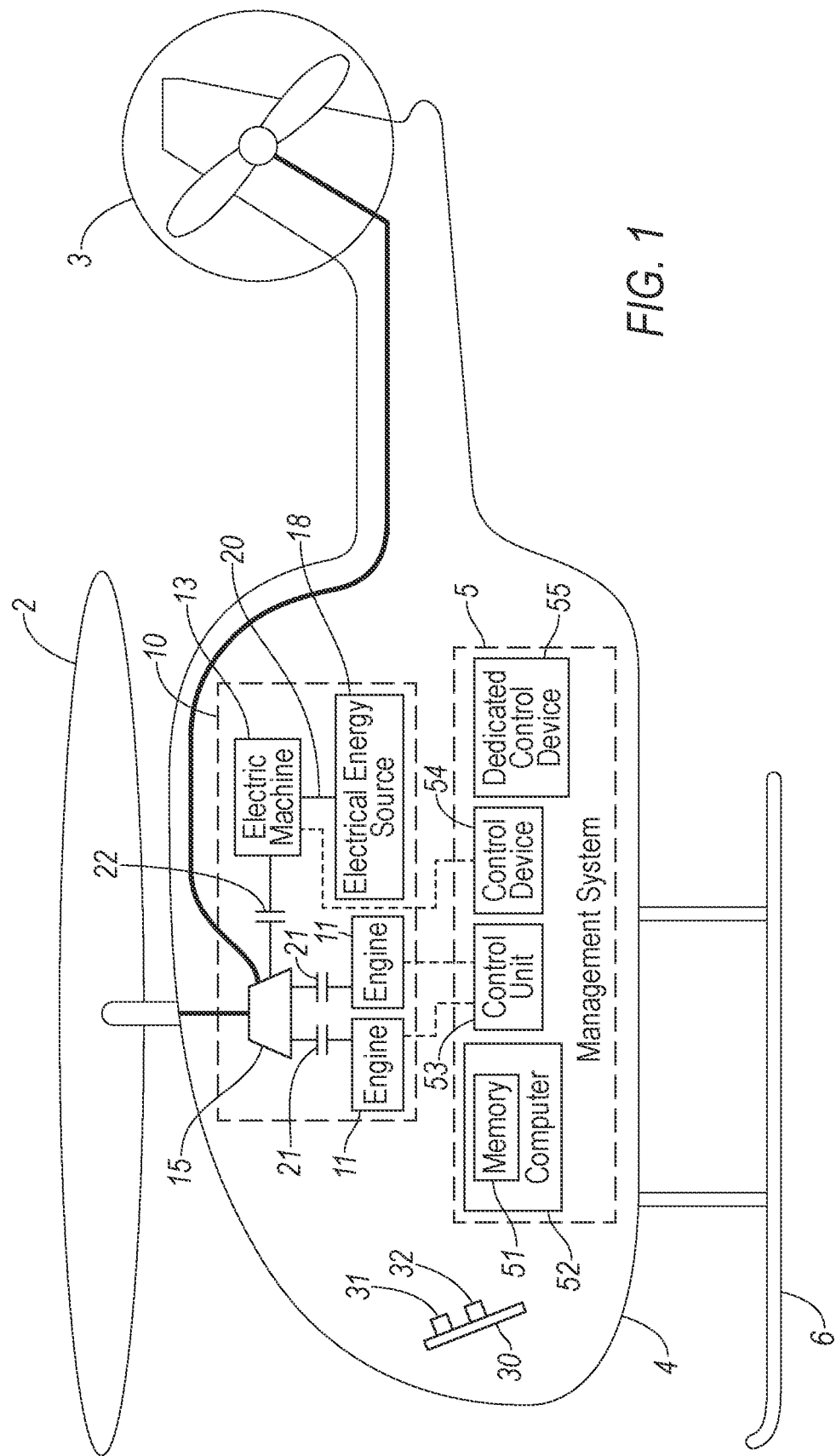
FIG. 1 shows a rotorcraft.

The rotorcraft 1 shown in FIG. 1 has a fuselage 4, an undercarriage 6 having skids, a hybrid power plant 10, and two rotors 2, 3 driven in rotation by the hybrid power plant 10. More precisely, the two rotors 2, 3 are constituted by a main rotor 2 arranged above the fuselage 4, and by an anti-torque tail rotor 3 arranged on a tail boom of the rotorcraft 1.

The hybrid power plant 10 includes two internal combustion engines 11, one electric machine 13, and one mechanical power transmission gearbox or "main gearbox" 15. The two engines 11 and the electric machine 13 are connected mechanically to the main gearbox 15. The main gearbox 15 is connected mechanically to both of the rotors 2, 3. In this way, the two engines 11 and the electric machine 13 can act either together or else independently from one another to drive the two rotors 2, 3 in rotation via the main gearbox 15.

The hybrid power plant 10 may also be provided with coupling devices 21, 22, such as clutches or freewheels, for example, respectively connecting the engines 11 and the electric machine 13 to the main gearbox 15.

These coupling devices 21, 22 enable, in particular, each engine 11 and the electric machine 13 to be capable of delivering mechanical power to the main gearbox 15, whereas the main gearbox 15 cannot deliver mechanical power to the engines 11 and to the electric machine 13.

The rotorcraft 1 also has an electrical energy source 18 that electrically powers the electric machine 13 via an electrical network 20, and a management system 5 for managing the hybrid power plant 10. For example, the management system 5 includes a computer 52 provided, in particular, with a memory 51, a control unit 53 for controlling the two engines 11, and a control device 54 for controlling the electric machine 13.

The control unit 53 serves to control and manage operation of each engine 11, and in particular to switch on or start, to switch off or stop, and to control the various speeds and the various operating parameters P of each engine 11, as well as to regulate the speed thereof. The control device 54 serves to control and manage operation of the electric machine 13, and, in particular, to control electrical powering of the electric machine 13 and interruption in said electrical powering, and to regulate the speed of said electric machine 13.

Finally, the rotorcraft 1 has an instrument panel 30 provided with a plurality of buttons 31, 32.

Figure 2:
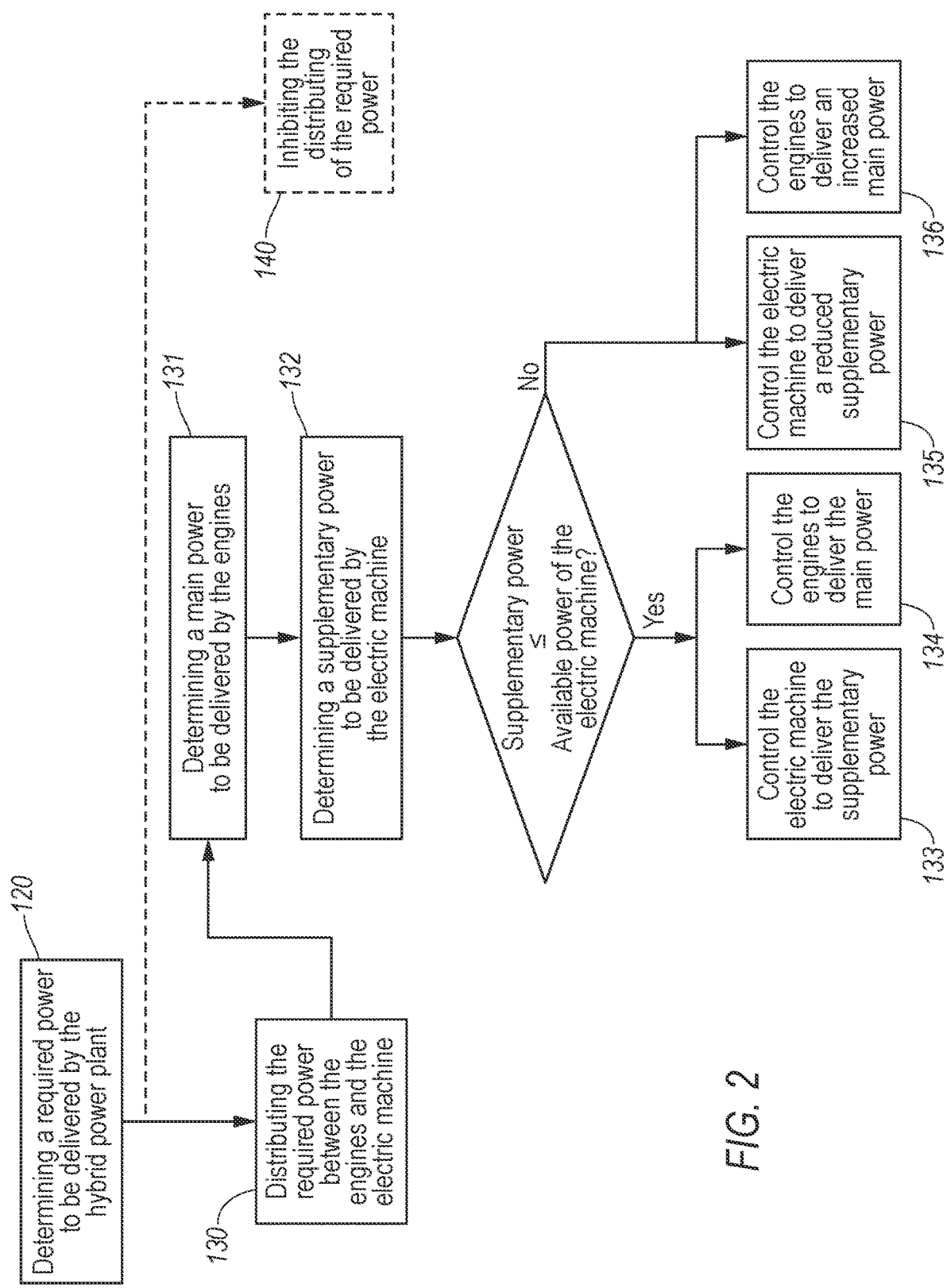
FIGS. 2 and 3 are block diagrams showing a method of optimizing the noise generated by a rotorcraft in flight.

The memory 51 stores instructions relating to a method of optimizing the noise generated by a hybrid power plant 10 of a rotorcraft in flight, a first block diagram of which method is shown in FIG. 2. The computer 52, which, for example, is formed by a processor or indeed by a logic circuit, makes it possible to perform the steps of the method.

This method of optimizing the noise generated by a hybrid power plant 10 of a rotorcraft in flight is performed following an order from a pilot of the rotorcraft 1 requiring moderation of the noise generated by the hybrid power plant 10 of the rotorcraft 1, e.g. via a first button 31 on the instrument panel 30. This method may also be performed automatically by the management system 5 of the rotorcraft 1.

Firstly, a determination step 120 for determining a required power to be delivered by the hybrid power plant 10 for the flight phase is performed using a power model generated, for example, as a function of the weight of the rotorcraft 1 and of the temperature and atmospheric pressure conditions outside the rotorcraft 1.

Then, the required power is distributed 130 between the two engines 11 and the electric machine 13 as a function of a target noise level and of the power required for the flight phase, as well as of a model for the noise generated by each engine 11 depending on an operating parameter P for each engine 11.

This distribution step 130 is performed by means of the control unit 53 that controls the two engines 11 and by means of a control device 54 that controls the electric machine 13. This distribution step 130 thus makes it possible to limit the noise generated by the hybrid power plant 10 during the flight phase by reducing the main power delivered by the two engines 11, and to compensate for this reduction in the main power with the first supplementary power delivered by the electric machine 13 silently.

The distribution step 130 includes the following sub-steps:
  a first determination sub-step 131 for determining a main power to be delivered by each engine 11 so that each engine 11 generates a sound level less than or equal to the target noise level, the main power being determined as a function of the target noise level and of the model for the noise generated by each engine 11; and
  a second determination sub-step 132 for determining a first supplementary power to be delivered by the electric machine 13 so that the hybrid power plant 10 delivers the required power.

When the first supplementary power is less than or equal to an available power of the electric machine 13, the distribution step 130 includes the following sub-steps:
  a first control sub-step 133 for controlling the electric machine 13 via the control device 54 to cause it to deliver the first supplementary power; and
  a second control sub-step 134 for controlling each engine 11 via the control unit 53 to cause it to deliver the main power.

This distribution step 130 thus makes it possible to limit the noise generated by the hybrid power plant 10 during the flight phase to the target noise level. The required power for the hybrid power plant is then equal to the sum of the main power delivered by each of the two engines 11 and of the first supplementary power delivered by the electric machine 13.

However, when the first supplementary power is greater than the available power, the distribution step 130 includes the following sub-steps:
  a third control sub-step 135 for controlling the electric machine 13 via the control device 54 to cause it to deliver a first supplementary power that is equal to the available power; and
  a fourth control sub-step 136 for controlling the two engines 11 via the control unit 53 to cause them to deliver a main power that is equal to a second supplementary power so that the hybrid power plant 10 delivers the required power.

In this situation, the distribution step 130 makes it possible to limit the noise generated by the hybrid power plant 10 during the current flight phase without however reaching the target noise level, but while preserving the safety of the current flight phase by guaranteeing that the required power is indeed delivered by the hybrid power plant 10. The required power is then equal to the sum of the second supplementary power delivered by each of the two engines 11 and of the first supplementary power delivered by the electric machine 13.

In both situations, the control device 54 makes it possible to regulate the electric machine 13 so that said electric machine 13 delivers the first supplementary power and, in parallel, the control unit 53 makes it possible to regulate the two engines 11 so as to reduce the power from each of them down to the main power. In addition, the control device 54 and the control unit 53 make sure that the hybrid power plant 10 continuously delivers the required power equal to the sum of the two main powers from the engines 11 and of the first supplementary power from the electric machine 13.

For example, the available power of the electric machine 13 is equal to a maximum power that the electric machine 13 can deliver without said machine being damaged.

The available power may also be calculated as a function of a quantity of electrical energy available in the electrical energy source 18, and as a function of a duration for which said quantity of electrical energy can be used until the electrical energy source 18 is exhausted. This available power is thus equal to the power that the electric machine 13 can deliver continuously for the predetermined duration until the quantity of electrical energy available in the electrical energy source 18 is exhausted.

Figure 4:
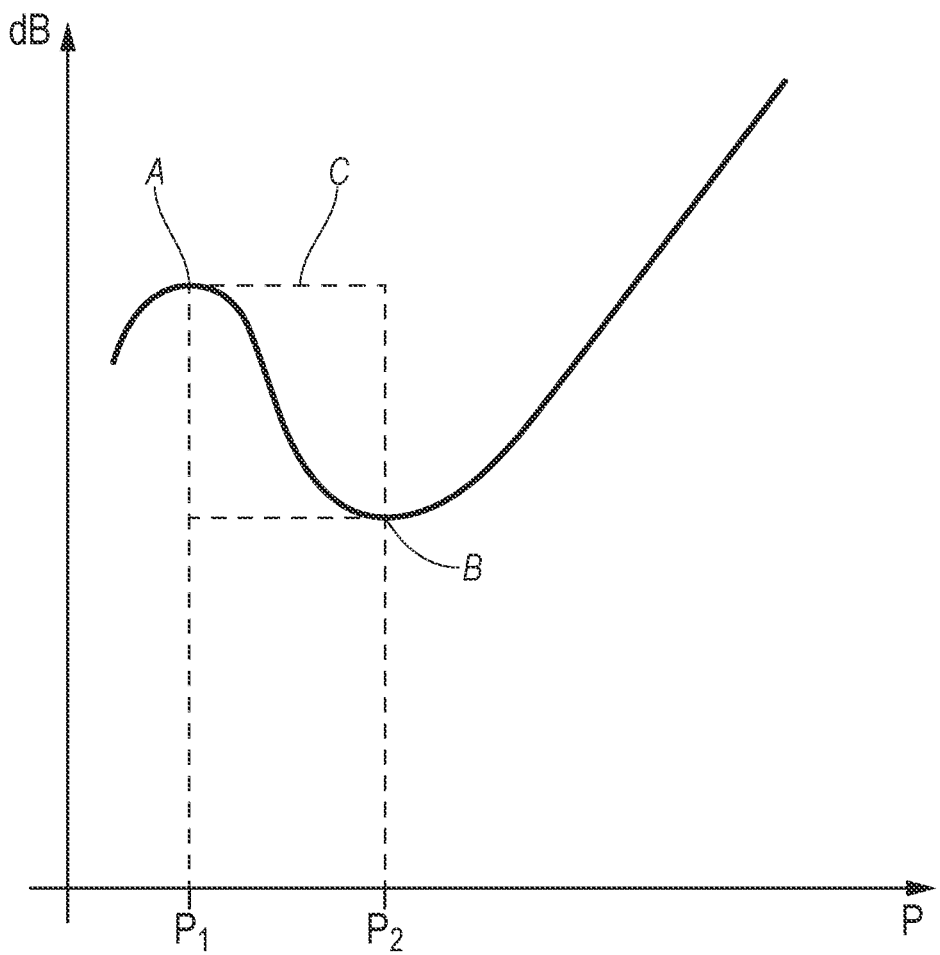
FIG. 4 is a graph showing the variation in the sound level of the noise generated by a fuel-burning engine.

For example, the model for the noise generated by each engine 11 may be defined by a curve representing the variation in the sound level of the noise generated by an engine 11 and shown on the graph in FIG. 4. This curve characterizes the noise generated by an engine 11, as expressed in decibels (dB), as a function of an operating parameter P of the engine 11. For example, an operating parameter P of the engine 11 may be the speed of rotation or an operating temperature of the engine 11, a torque delivered by the engine 11, or indeed the power delivered by said engine 11.

This model may also be defined by a set of curves, the curves corresponding, for example, to respective flight conditions, in particular, the temperature and the atmospheric pressure outside the engine 11, and to a given weight of the rotorcraft 1. The curve or the set of curves is/are generated during bench testing of the engines 11 or indeed during flight testing of the rotorcraft 1 prior to it being commissioned. Updating may also be performed during the life of the rotorcraft 1, depending on how each engine 11 changes and/or ages.

The curve shown on the graph of FIG. 4 has two extrema A and B, a first extremum A, forming a maximum, corresponding to a first operating parameter point P1, and a second extremum B, forming a minimum, corresponding to a second operating parameter point P2. The curve decreases between the two extrema A and B and constitutes a decrease zone C that corresponds to values of the operating parameter P lying in the range [P1, P2].

Therefore, during the distribution step 130 for distributing the required power, if the power delivered by each engine 11 causes at least one engine 11 to operate in the decrease zone C, namely between the first and second extrema A and B, the control unit 53 controls said at least one engine 11 in such a manner that the value of the operating parameter P is increased to exceed the value P2 and therefore the second extremum B in order to leave the decrease zone C. The increase in this operating parameter P causes an increase in the power delivered by said at least one engine 11. Therefore, the control device 54 controls the electric machine 13 in such a manner that the first supplementary power is reduced so that the hybrid power plant 10 delivers the required power.

However, the power delivered by the hybrid power plant 10 may become greater than the power required for the flight phase of the rotorcraft 1, it being necessary for the power delivered by an engine 11 to be increased while the electric machine 13 is not delivering any first supplementary power. Therefore, and if the electric machine 13 is reversible, said electric machine 13 may operate in generator mode so as to optimize the surplus power delivered by the two engines 11 and so as to transform it into electrical energy. The hybrid power plant 10 then delivers only the required power to the rotors 2, 3 of the rotorcraft 1.

Figure 3:
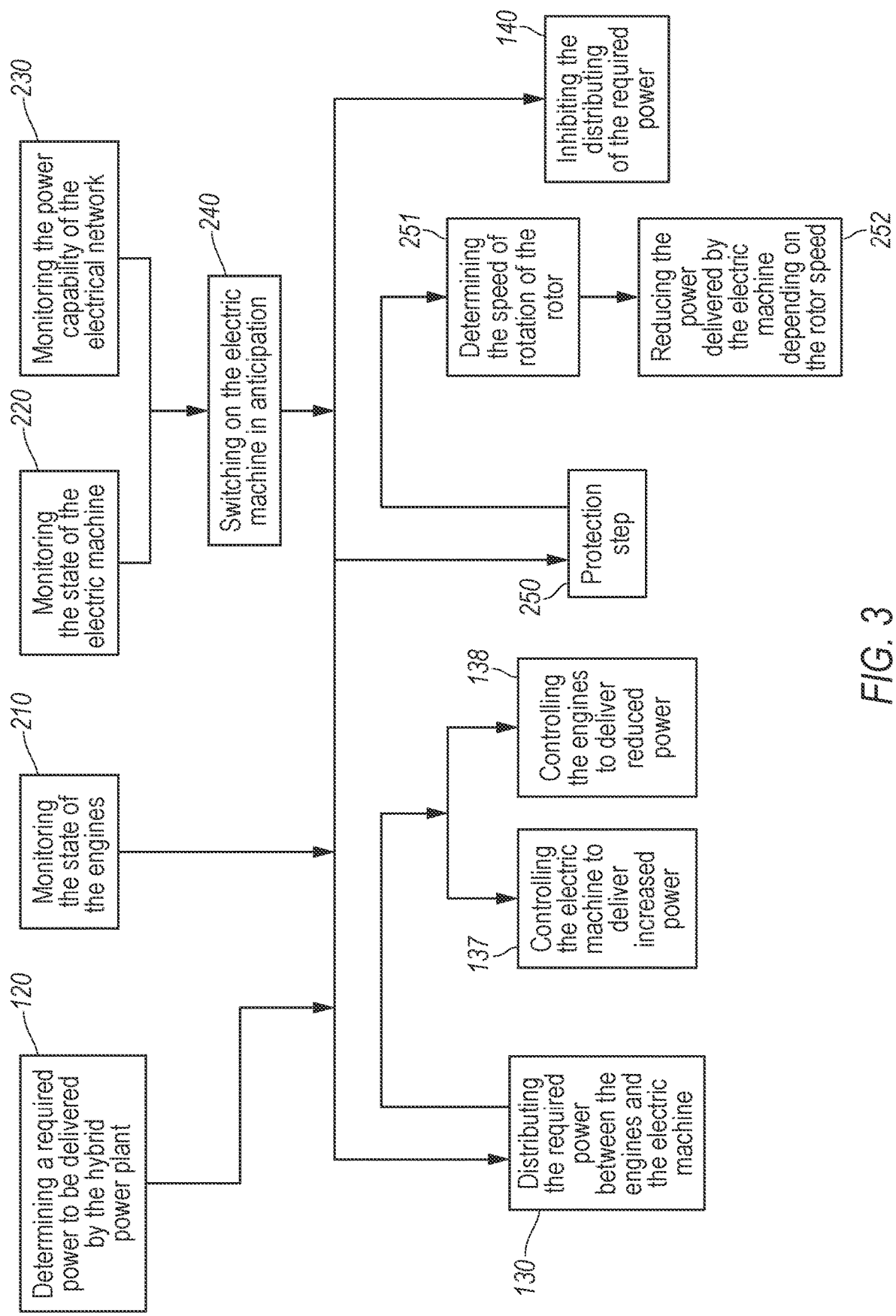

A second block diagram of a method of optimizing the noise generated by a hybrid power plant 10 of a rotorcraft 1 is shown in FIG. 3. Like the preceding method, this method includes a determination step 120 for determining a required power to be delivered by the hybrid power plant 10 for the flight phase, and a distribution step 130 for distributing the required power between the two engines 11 and the electric machine 13. Monitoring steps 210-230 may optionally be performed, preferably in parallel and parallel to the determination step 120, although said monitoring steps 210-230 may be performed sequentially.

A first monitoring step 210 makes it possible to monitor the engines 11 and to determine whether each of said engines 11 is in an on state or in an off state, or in a state making it possible to drive the main rotor 2 while complying with a predetermined setpoint speed of rotation. This first monitoring step 210 is performed by means of the control unit 53. The control unit 53 then delivers a first electrical signal to the computer 52 of the management system 5, which signal contains information indicating the state of each engine 11 and optionally indicating its speed and the states of its parameters P.

A second monitoring step 220 makes it possible to monitor the electric machine 13 and to determine whether the electric machine 13 is in an on state or in an off state, as well as to determine its speed. This second monitoring step 220 is performed by means of the control device 54. The control device 54 then delivers a second electrical signal to the computer 52, which signal contains information indicating the state of the electric machine 13 and optionally indicating its speed.

A third monitoring step 230 for monitoring the electrical network 20 and for checking whether the electrical network 20 is capable of powering the electric machine 13, by monitoring, in particular, the electrical power and the electrical energy that the electrical network 20 can deliver, as well as the electrical capacity of the electrical energy source 18. For example, this third monitoring step 230 may be performed by means of a dedicated control device 55.

An optional anticipated switch-on step 240 for switching on the electric machine 13 in anticipation may then be performed whenever a powering authorization is issued following the third monitoring step 230, and if the second monitoring step 220 determines that the electric machine 13 is in an off state. For example, the electric machine 13 may be switched on, without transmitting mechanical power to each rotor 2, 3, in anticipation of a first control sub-step 133 for controlling the electric machine 13.

Then, if the two engines 11 are in states making it possible to drive the main rotor 2 while complying with a predetermined setpoint speed of rotation, the distribution step 130 for distributing the required power between the two engines 11 and the electric machine 13 is performed.

A fifth control sub-step 137 for controlling the electric machine 13 via the control device 54 and a sixth control sub-step 138 for controlling the two engines 11 via the control unit 53 are performed in parallel.

During the fifth control sub-step 137, the power delivered by the electric machine 13 is increased progressively. In parallel, during the sixth control sub-step 138, the control unit 53 controls the two engines 11 by reducing the operating parameters P in order to reduce the power delivered by each engine 11 while also complying with the predetermined setpoint speed of rotation for each rotor 2, 3, in particular, for the main rotor 2.

So long as the operating parameter P of each engine 11 is greater than the value corresponding to the target noise level, the power from the electric machine 13 continues to increase. Therefore, the operating parameter P decreases as does the noise generated by the engines 11.

As soon as the operating parameter P of each engine 11 is equal to the parameter value corresponding to the target noise level, the power from the electric machine 13 ceases to increase.

When the power from the electric machine 13 reaches the value of the available power, the power from the electric machine 13 also ceases to increase and stabilizes at said available power although the operating parameter P of each engine 11 is not equal to the parameter value corresponding to the target noise level.

If the operating parameter P of each engine 11 is greater than the parameter value corresponding to the target noise level while the power form the electric machine 13 ceases to increase, the noise generated by the hybrid power plant 10 during the current flight phase is limited without however reaching the target noise level, but while preserving the safety of the current flight phase by guaranteeing that the required power is indeed delivered by the hybrid power plant 10.

Furthermore, if the operating parameter P of each engine 11 is less than the parameter value corresponding to the target noise level, the operating point P lying between the two extrema A and B of the curve of FIG. 4, the power from the electric machine 13 decreases in order to cause the operating parameter P to increase and in order to cause the operating point to go downstream from the second extremum B. If the electric machine 13 does not deliver any power, then said electric machine 13 can operate in generator mode, if said electric machine 13 is reversible, so as to transform the surplus power delivered by the power plant 10 into electrical energy. That electrical energy is then used by the electrical network 20 of the rotorcraft 1, or else it is stored in at least one electrical energy source 18 of the rotorcraft 1.

The method of optimizing the noise may optionally also include a protection step 250 made up of two sub-steps, namely a determination first sub-step 251 for determining a speed of rotation of the main rotor 2 and a reduction second sub-step 252 for reducing the power from the electric machine 13. The determination first sub-step 251 makes it possible to determine a speed of rotation of the main rotor 2 by means of a determination device 12. Then, if the speed of rotation of the main rotor 2 is greater than a predetermined speed, the reduction second sub-step 252 for reducing the power is performed so as to reduce the power delivered by the electric machine 13 and so as to avoid the main rotor 2 reaching overspeed. This reduction second sub-step 252 for reducing the power of the electric machine 13 may go as far as switching off the electric machine 13.

In addition, the method of the invention for optimizing the noise may also, optionally and in parallel with the first control sub-step 133 for controlling the electric machine 13, apply the third monitoring step 230 for monitoring the electrical network 20 and then the reduction sub-step 252 for reducing the power of the electric machine 13, in order to monitor the electrical network 20 during the first control sub-step 133. Thus, if the third monitoring step 230 detects that the electrical network 20 is no longer capable of electrically powering the electric machine 13 in order to deliver the first supplementary power, an alert may be transmitted and the reduction sub-step 252 for reducing the power from the electric machine 13 is performed, possibly down to the electric machine being switched off, as a function of the state of the electrical network 20.

In addition, the method of optimizing the noise generated by a rotorcraft 1 may also optionally include an inhibition step 140 for inhibiting the distribution step 130 for distributing the required power. Depending on the flight phase of the rotorcraft 1, the predominant noise source of the rotorcraft 1 may be at least one of the two rotors 2, 3, at least one of the two engines 11 or indeed the main gearbox 15. Therefore, the inhibition step 140 inhibits the distribution step 130 for distributing the required power when the predominant noise source of the rotorcraft 1 is not an engine 11, e.g. during the level cruising and approach flight phases.

Furthermore, the target noise level that the rotorcraft 1 should preferably not exceed during the flight phase is a function of the environment overflown by the rotorcraft 1 and/or of a height of flight of the rotorcraft 1 relative to the ground overflown during said flight phase.

Naturally, the present invention can be the subject of numerous variants as to its implementation. Although several implementations are described, it should readily be understood that it is not conceivable to identify exhaustively all possible implementations.

In particular, a rotorcraft 1 having a plurality of lift main rotors 2, e.g. a rotorcraft 1 having four lift main rotors 2, may apply the method of optimizing the noise generated by a hybrid power plant of a rotorcraft 1 in flight as described.

It is naturally possible to envisage replacing any of the means described by equivalent means without going beyond the ambit of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of optimizing noise generated by a hybrid power plant of a rotorcraft during a flight phase, the hybrid power plant being provided with at least one engine and with at least one electric machine;

wherein the method includes the following steps:
 a determination step for determining a required power to be delivered by the hybrid power plant for the flight phase; and
 a distribution step for distributing the required power between the engine(s) and the electric machine(s) as a function of a target noise level, the required power, and a model for a noise generated by the engine(s) depending on an operating parameter of the engine(s),
wherein the distribution step includes the following sub-steps:
a first control sub-step for controlling the electric machine(s) to progressively increase a supplementary power delivered by the electric machine(s); and
a second control sub-step for controlling the engine(s) to reduce a main power delivered by the engine(s) so that the hybrid power plant delivers the required power; and
wherein the model for the noise generated by the engine(s) includes a first increase zone in which the model models the noise generated by the engine(s) increasing as the operating parameter increases followed by a decrease zone in which the model models the noise generated by the engine(s) decreasing as the operating parameter further increases followed by a second increase zone in which the model models the noise generated by the engine(s) increasing as the operating parameter further increases, and while, during the distribution step, the main power delivered by the engine(s) leads to the engine(s) operating in the decrease zone, the distribution step further includes controlling the engine(s) to increase the operating parameter of the engine(s) and thereby increase the main power delivered by the engine(s) and cause the engine(s) to cease operating in the decrease zone and to instead operate in the second increase zone, and controlling the electric machine(s) to reduce the supplementary power delivered by the electric machine(s) so that the hybrid power plant delivers the required power.

2. The method according to claim 1,
wherein the supplementary power delivered by the electric machine(s) increases so long as the operating parameter of the engine(s) is greater than a value corresponding to the target noise level, the operating parameter decreasing in parallel, and when the supplementary power is equal to an available power, the supplementary power ceases to increase.

3. The method according to claim 1,
wherein, while a power delivered by the hybrid power plant is greater than the required power, the electric machine(s) operate(s) in generator mode to transform surplus power delivered by the engine(s) into electrical energy.

4. The method according to claim 1,
wherein the method further includes the following steps:
a first monitoring step for monitoring the engine(s) to determine whether the engine(s) is/are in an on state, in an off state, or in a state making it possible to drive a rotor of the rotorcraft;
a second monitoring step for monitoring the electric machine(s) to determine whether the electric machine(s) is/are in an on state or in an off state;
a third monitoring step for monitoring an electrical network of the rotorcraft that powers the electric machine(s) to check that the electrical network can power the electric machine(s); and
an anticipated switch-on step for switching on the electric machine(s) in anticipation as soon as a powering authorization is issued whenever a powering authorization is issued following the third monitoring step, and if the second monitoring step determines that the electric machine(s) is/are in an off state.

5. The method according to claim 1,
wherein the target noise level is a function of the environment overflown by the rotorcraft and/or of a height of flight of the rotorcraft relative to the ground of the overflown environment.

6. The method according to claim 1,
wherein the method further includes an inhibition step for inhibiting the distribution step for distributing the required power when, during the flight phase, the engine(s) is/are not a predominant noise source.

7. The method according to claim 6,
wherein the flight phase, in which the engine(s) is/are not the predominant noise source, is a level cruising flight phase or an approach flight phase.

8. The method according to claim 1,
wherein the method further includes a protection step made up of the following sub-steps:
a determination sub-step for determining a speed of rotation of a rotor of the rotorcraft; and
a reduction sub-step for reducing the supplementary power delivered by the electric machine(s) so that the hybrid power plant delivers the required power, if the speed of rotation is greater than a predetermined speed.

9. The method according to claim 1,
wherein the operating parameter of the engine(s) is a speed of rotation of the engine(s), an operating temperature of the engine(s), or a torque delivered by the engine(s).

10. The method according to claim 1,
wherein, the engine(s) is/are turboshaft engine(s) comprising a gas generator and a free turbine, the operating parameter of the engine(s) is a speed of rotation of the gas generator, a temperature of the gases at an outlet of a combustion chamber of the gas generator, or a torque delivered by the free turbine or by the gas generator.

11. A system for optimizing noise generated by a hybrid power plant of a rotorcraft during a flight phase, the hybrid power plant being provided with at least one engine and with at least one electric machine, the system comprising:
a controller configured to determine a required power to be delivered by the hybrid power plant for the flight phase, and to distribute the required power between the engine(s) and the electric machine(s) as a function of a target noise level, the required power, and a model for a noise generated by the engine(s) depending on an operating parameter of the engine(s);
wherein to distribute the required power between the engine(s) and the electric machine(s) the controller is further configured to control the electric machine(s) to progressively increase a supplementary power delivered by the electric machine(s) and control the engine(s) to reduce a main power delivered by the engine(s) so that the hybrid power plant delivers the required power; and
the model for the noise generated by the engine(s) includes a first increase zone in which the model models the noise generated by the engine(s) increasing as the operating parameter increases followed by a decrease zone in which the model models the noise generated by the engine(s) decreasing as the operating parameter further increases followed by a second increase zone in which the model models the noise generated by the engine(s) increasing as the operating parameter further increases, and while the main power delivered by the engine(s) leads to the engine(s) operating in the decrease zone, the controller is further configured to control the engine(s) to increase the operating parameter of the engine(s) and thereby increase the main power delivered by the engine(s) and cause the engine(s) to cease operating in the decrease zone and to instead operate in the second increase zone, and control the electric machine(s) to reduce the supplementary power delivered by the electric machine(s) so that the hybrid power plant delivers the required power.

12. The system of claim 11,
wherein the operating parameter of the engine(s) is a speed of rotation of the engine(s), an operating temperature of the engine(s), or a torque delivered by the engine(s).

13. A rotorcraft comprising:
a hybrid power plant provided with at least one engine and with at least one electric machine; and
a system for optimizing noise generated by the hybrid power plant during a flight phase, the system including a controller configured to determine a required power to be delivered by the hybrid power plant for the flight phase, and to distribute the required power between the engine(s) and the electric machine(s) as a function of a target noise level, the required power, and a model for a noise generated by the engine(s) depending on an operating parameter of the engine(s); and
wherein to distribute the required power between the engine(s) and the electric machine(s) the controller is further configured to control the electric machine(s) to progressively increase a supplementary power delivered by the electric machine(s) and control the engine(s) to reduce a main power delivered by the engine(s) so that the hybrid power plant delivers the required power; and
the model for the noise generated by the engine(s) includes a first increase zone in which the model models the noise generated by the engine(s) increasing as the operating parameter increases followed by a decrease zone in which the model models the noise generated by the engine(s) decreasing as the operating parameter further increases followed by a second increase zone in which the model models the noise generated by the engine(s) increasing as the operating parameter further increases, and while the main power delivered by the engine(s) leads to the engine(s) operating in the decrease zone, the controller is further configured to control the engine(s) to increase the operating parameter of the engine(s) and thereby increase the main power delivered by the engine(s) and cause the engine(s) to cease operating in the decrease zone and to instead operate in the second increase zone, and control the electric machine(s) to reduce the supplementary power delivered by the electric machine(s) so that the hybrid power plant delivers the required power.

14. The rotorcraft of claim 13,
wherein the operating parameter of the engine(s) is a speed of rotation of the engine(s), an operating temperature of the engine(s), or a torque delivered by the engine(s).

* * * * *